Figure 1:
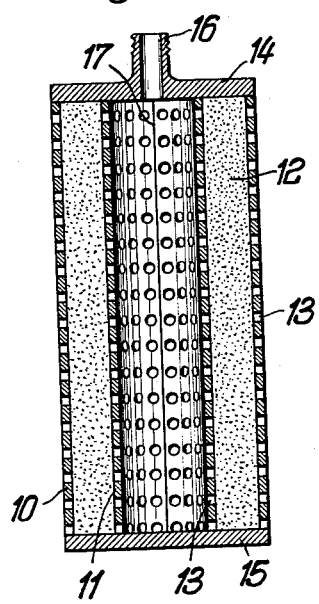

July 5, 1966  F. ZWICK  3,259,677

METHOD OF PRODUCING FLUID-PERMEABLE SHAPED BODIES

Filed Jan. 31, 1964

Inventor:
Franz Zwick
by Michael S. Striker
Attorney

3,259,677
METHOD OF PRODUCING FLUID-PERMEABLE SHAPED BODIES
Franz Zwick, Reuttierstrasse 52, Neu-Ulm (Danube), Germany
Filed Jan. 31, 1964, Ser. No. 351,266
Claims priority, application Germany, Sept. 4, 1957,
Z 6,291; May 30, 1958, Z 6,681
4 Claims. (Cl. 264—126)

This application is a continuation-in-part of my copending application Serial Number 758,789, filed September 3, 1958 and entitled: "Method and Means for the Manufacture of Permeable Plastic Products and Shaped Products Manufactured in Accordance With Such Method," and now abandoned.

The present invention relates to a method of producing gas and liquid-permeable synthetic plastic products, such as filters, diaphragms, receptacles for live plants and the like.

It is already known to manufacture porous shaped products from organic synthetic substances, especially from various polymerisates. According to one prior process, a synthetic material is introduced in loose granular form into a mold, and the mold is thereupon externally heated to such temperatures that the heat-softened particles adhere to each other along their contact surfaces and form a unitary porous structure. A disadvantage of the just described process is in that the porosity of products so obtained is not uniform because the heating of plastic particles in an externally heated mold is not uniform which results in a product with pores of greatly differing magnitudes. In addition, the danger is ever present that certain zones of the granular product which may be exposed to higher temperatures will melt altogether and, after hardening, will result in at least partially pore-free body. Even by very slowly and carefully heating the material in the mold under constant accurate temperature control, it is not possible to sufficiently eliminate these disadvantages. Consequently, there are great variations in the permeability of shaped bodies produced in this manner and it is not possible by following this process to obtain a uniform product.

Another known process of making porous synthetic shaped articles also utilizes granular starting materials in admixture with fermenting or swelling agents. When exposed to heat produced by surrounding hot water or steam, the swelling agents develop gas bubbles and cause considerable increase in the volume, i.e., swelling, of the plastic particles. The latter are caused to adhere to each other in such expanded or inflated condition under the influence of the pressure created thereby, and form a unitary, porous article in which the relatively fine pores resulting from gas bubbles generated by the swelling agent or agents are not in communication with each other and thus do not constitute continuous channels or passages for the flow of a gaseous or liquid medium between the opposing walls of the finished product.

It has also been proposed to produce porous shaped bodies by a method according to which a mass of finely particulate material, such as a pulverulent or fibrous material which is not heat-softenable, is introduced into a permeable mold together with a heat-softenable binding agent, such as resin, asphalt or the like, and to form in the mold a coherent mass by heat-activation of the binding agent. The material in the mold is heated by passing therethrough a hot heating medium such as hot air or steam. Thereby, the binding agent is softened and will cause adhesive adherence of the particulate mass. Due to the very small size of the particles, the mass will have only very small pores and thus will offer considerable resistance to the flow of the heating medium, so that the heating medium must be introduced under a correspondingly high pressure. Although according to this method the pulverulent or fibrous particles which are not softened by heat will possess considerable strength even when heated and thus will to some extent resist further reduction in the pore size, nevertheless, due to the high pressure of the heating medium which does not flow evenly through the mass, as well as due to localized variations in the concentration of the binding agent within the mass, an uneven change in the pore size takes place within different zones of the mass which is thus treated.

An important object of the present invention is to provide an improved method of manufacturing liquid- and gas-permeable products consisting exclusively of thermoplastic material and having a substantially even porosity and fluid permeability throughout the entire product.

A further object of the invention is to provide a simple method of manufacturing fluid-permeable plastic articles which is particularly suitable for the production of various liquid filters, gas filters, diaphragms for use in various branches of the chemical industry, and receptacles or pots for live plants and the like.

An additional object of the invention is to provide a method of making fluid-permeable synthetic products, which may be practiced with a great variety of readily available granular, thermoplastic synthetic substances.

The above and certain other objects of the invention are attained by the provision of a method which consists essentially in that loose grain-sized particles of a heat-softenable plastic material forming a granular mass are subjected to the action of a moving heated fluid medium in a closed, porous, permeable or perforated mold, the heating medium being caused to penetrate through one wall of the mold, to thereupon pass through the pores forming a system of interstices between the individual thermoplastic grains of the granular mass, whereby the latter are softened sufficiently to adhere to each other along their contacting surfaces. The fluid heating medium, after passing through the mold, is then allowed to escape through the pores, perforations or passages in another wall portion of the mold.

It has been suggested, as pointed out above, to pass a heating fluid through a mass of particles which cannot be heat-softened, such as pulverulent or fibrous particles which do not possess any thermoplastic properties, and to have admixed to the mass of non-thermoplastic particles a binding agent which will be activated at the elevated temperature of the heating medium. However, this method could not be used with pulverulent or fibrous, finely subdivided particles which would be softened by contact with the heating medium. In other words, this method is not applicable if the finely subdivided pulverulent or fibrous particles consist of a thermoplastic synthetic material. In such case, the softening of the finely subdivided material would cause narrowing or complete elimination of the pores between the individual substantially softened particles. Furthermore, due to the substantial softening of the particles and the irregular flow of the heating fluid through different portions of the mass, there also will be caused a widening of some of the pores or interstices due to the relatively high pressure of the heating fluid. This will lead to the formation of relatively wide channels for passage of the heating fluid, and therebetween to portions of greatly reduced pore size or even to the formation of portions of the now coherent mass which are substantially free of pores. Thus, if it were attempted to treat, as described above, very finely subdivided thermoplastic material, a shaped body of very uneven porosity and permeability would be obtained.

Surprisingly, it has been found that according to the method of the present invention, notwithstanding differences in the degree of heating of various portions of the mass in the mold, the size of the pores between the exclusively thermoplastic particles of the mass will remain substantially unchanged during passage of the heating fluid therethrough. This is due to the fact that the individual particles of the thermoplastic material according to the present invention are of granule size, i.e., the granular mass of thermoplastic material consists substantially of particles or grains having a diameter of at least 0.05 mm. Thereby it is accomplished that the pores between the individual granules will form a system of relatively wide channels or interstices through which the heating fluid can flow easily without requiring substantial over-pressure, and it is further achieved thereby that substantially only the outer or surface portions of the granules will become softened and thereby will be made to adhere to each other, while the core portions of the individual granules remain substantially unaffected by the heating medium. Due to these solid unsoftened core portions and due to the fact that the heating fluid passes through the interconnected pores at a relatively low overpressure, the original or initial pore sizes will change very little, or not at all, during the passage of heating fluid through the granular mass. Furthermore, while in the vicinity of the inlet wall of the heating fluid the temperature will be higher than in the vicinity of the outlet wall and this difference in temperature will become particularly significant immediately after shutting off the flow of the heating fluid, nevertheless the pores even in the vicinity of the inlet wall for the heating fluid, i.e., the pores between granules which are exposed to the highest temperature, will not be substantially reduced. Thus, by proceeding as outlined above, i.e., by passing the heating fluid through a thermoplastic mass of granules and not through a pulverulent mass, a shaped body is formed which is of high and substantially even porosity and fluid permeability throughout.

The heating fluid may be steam or a true gas such as hot air. However, hot air is preferable to steam because, by utilizing hot air, vapor condensation at the initially cold mold and granular mass is avoided. Such vapor condensation which will occur upon starting the passage of steam through the mold, will initially cause reduction in the cross-sectional area of the pores which is available for passage of steam therethrough, and will require evaporation of the condensate by subseqeuntly introduced portions of the heating fluid, i.e. steam.

The mold may consist of a perforated, but preferably sintered and porous, permeable, metallic material capable of permitting the flow of heated fluids therethrough. It is also possible to manufacture the porous mold of a thermoplastic material in accordance with the above-described method. However, care should be taken that the melting point of the material of which the plastic mold is made be higher than the melting point of the plastic granules of which a shaped body is to be formed in the mold.

A mold of porous material, i.e. a mold having channels formed of interconnected relatively small pores is preferred as compared with a mold having fluid inlet and outlet walls made, for instance, of perforated sheet material. The preferred porous mold combines high mechanical strength with a very great number of closely adjacent channels of small diameter through which the heating fluid can be introduced into the mold in a highly even manner which again reduces the danger of changing the pore sizes of the portion of the granular thermoplastic mass which is located in the mold in the vicinity of the more strongly heated fluid inlet portion of the mold. The highly even porosity and high permeability of shaped products produced in accordance with the method of the present invention particularly by utilizing a porous mold, permits to obtain products, i.e., porous shaped articles, suitable for many purposes.

Such products, among many other applications, are particularly suitable for use as receptacles for live plants, i.e., as flower pots and the like, because they permit communication of air to the soil in which the plant is rooted and also permit accumulation of relatively large quantities of water in their channels or passages whereby the plant requires less frequent watering because the plastic pot or jar constitutes a kind of water reservoir therefor.

A porous permeable plastic pot or jar makes possible convenient and rapid removal of scale or incrustations depositing when water evaporates from the external surfaces, this being in direct contrast with conventional flower pots made of burned clay to which the scale adheres with considerable force and in which the removal of scale presents certain problems, thereby affecting the esthetic appearance of such products.

Figure 2:
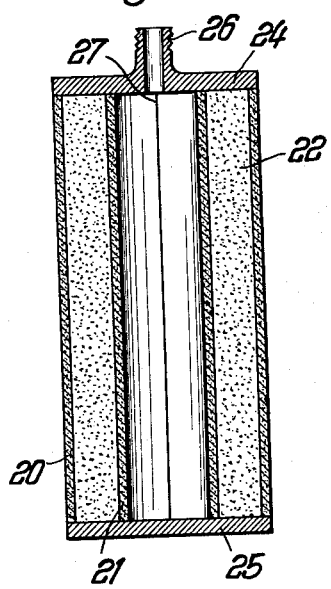
Figure 3:
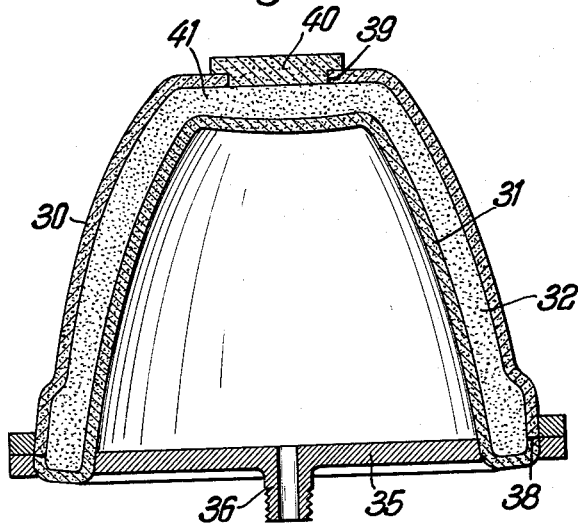

The novel features which are considered as characteristic for the present invention are set forth in particular in the appended claims. The invention itself, however both as to its construction and its method of operation, together with additional objects and advantages thereof, will be best understood from the following description of certain specific embodiments when read in connection with the accompanying drawing, in which:

FIGS. 1 to 3 are axial sections through three different forms of apparatus for the practice of my method.

Referring now in greater detail to the drawing, and first to FIG. 1, there is shown a mold for the manufacture of a porous, permeable plastic article in the shape of a hollow cylinder. The mold comprises a pair of coaxial cylinders 10, 11 made of sheet metal and formed with perforations 13. A granular synthetic substance 12 fills the mold space between the periphery of inner cylinder 11 and the surface surrounding the bore defined by the outer cylinder 10. The lower end of cylinder 10 is closed by a discoid plate 15, and a similar plate 14 closes the upped end of said cylinder. The latter plate is formed with a concentric externally threaded extension or nozzle 16 for connection to a conduit (not shown) leading to a source of heated fluid medium, such as steam or the like. The heated fluid substance entering through the bore in nozzle 16 fills the interior of inner cylinder 11 and penetrates through the apertures or perforations 13 therein to enter into and be uniformly distributed in spaces between the particles of granular synthetic substance 12, and to thereupon escape through perforations 13 in the outer cylinder 10. The shaped article formed by adhering granulae of the plastic substance 12 is readily separable from the adjacent walls of molding cylinders 10, 11. To facilitate such separation, each of cylinders 10, 11 may be taken apart into a pair of semicylindrical shells along line 17.

The configuration of mold shown in FIG. 2 is identical with that illustrated in FIG. 1. Thus, a pair of coaxial cylinders 20, 21 defines therebetween an annular mold space filled by a granular synthetic substance 22, one end of the mold being closed by a discoid plate 25 and the other end by a similar plate 24 formed with an externally threaded nozzle 26 for connection to a source of heated fluid medium. The difference is in the material of mold cylinders 20, 21 which consist of a porous, permeable substance.

Referring now to FIG. 3, there is shown a mold consisting of an inner toroid member 31 and a coaxial outer toroid member 30. It can be said that the members 30, 31 are pot- or jar-shaped in that they taper from their open lower ends toward their upper ends or bases. The mold sections are in abutment along their annular end surfaces 38 and are thus separable from each other. The base of outer mold section 30 defines an aperture 39 which may be sealed by a cover or lid 40. When the cover is removed, a granular synthetic substance 32 may be introduced into the mold space between sections 30, 31 to assume the shape of a pot or jar when the granulae are caused to adhere to each other under the influence of a heated fluid medium which may be introduced into the interior of inner mold section 31 through the externally threaded nozzle or nipple 36 forming part of a non-permeable supporting plate 35. The latter is preferably rigidly connected with the open end of mold section 31. Nozzle 36 may be threadedly connected with a conduit (not shown) leading to a source of heated fluid medium. Mold sections 30, 31 and the cover 40 consist of a porous, permeable material. The heated fluid medium which enters through nozzle 36 fills the interior of mold section 31 and penetrates through the latter's porous walls to be uniformly divided in the mold space between the synthetic particles 32 and is free to escape through the porous outer mold section 30 and its cover 40. The shaped article may be removed from the mold upon lifting the outer section 30 and its cover 40 away from the inner section 31. Portion 41 of the shaped article 32 formed by the base of inner mold section 31 and the base of outer mold section 30 in combination with the cover 40 constitutes the base or bottom element of a pot or jar of customary shape.

After subjecting the plastic particles to the action of a heated fluid medium, the product may be rapidly cooled by introducing air at room temperatures through the nozzle 36 and through the permeable wall of inner mold section 31 to pass through the passages or channels in shaped article 32 and to escape through the permeable wall of outer mold section 30 and its cover 40.

As compared with the mold 10–11 shown in FIG. 1 which consists of perforated sheet metal, the mold 20–21 of FIG. 2, and 30, 31, 40 of FIG. 3, which are made of porous permeable materials, possess important advantages.

These porous molds further improve the process of the present invention due to the fact that they possess a larger number of closely adjacent channels for the passage of heating fluid therethrough than could be found in a mold wall made of perforated sheet metal. It follows that the heating fluid can be introduced into the mold through a porous mold wall in a particularly even manner and thus will evenly contact the mass of thermoplastic granules adjacent to such porous mold wall. Thereby, the danger of uneven heating of the granular mass and widening of the pores thereof which are directly contacted by the streamlets of heating fluid emanating from the mold wall as well as narrowing of pores adjacent thereto, will be greatly reduced or avoided. Thereby, a further cause of an uneven change in the pore sizes of the thermoplastic material in the vicinity of the more strongly heated fluid inlet portion of the mold is reduced. Furthermore, it has been found that molds of porous material, i.e., including heating fluid inlet and outlet walls of porous material, possess a considerable higher mechanical strength as compared with densely perforated sheet metal molds which, furthermore, cannot be so densely perforated as to achieve even distribution of the heating fluid comparable to that obtainable by utilizing porous molds.

The porous, permeable walls of mold 20, 21 of FIG. 2 and of mold 30, 31, 40 shown in FIG. 3, preferably consist of a sintered metallic substance. Molds made of sintered metal are shock-resistant and are capable of extended use. The manufacture of such permeable molds is carried out in known manner by sintering of metallic particles in suitable forms.

It is also within the scope of this invention to manufacture porous, permeable molds from a synthetic material, i.e., to manufacture the molds in accordance with the method described in connection with FIGS. 1 to 3. The difference is in that the melting point of particles forming a synthetic mold must be higher than the melting point of particles 12, 22 and 32 which form the products shaped in such permeable plastic molds. A suitable synthetic material for the mold with a sufficiently high melting point is tetrafluorethylene, its melting point being at approximately 300° C.

As being stated, the porous, permeable shaped synthetic articles 32 illustrated in FIG. 3 between permeable mold sections 30, 31 can be utilized as a jar or pot for immediate planting of live flowers and other plants. This is in contrast with the plastic flower pots of conventional manufacture which are not suited for direct reception of plants but are merely used as decorative receptacles for the actual flower pots which are made of porous burned clay. It has been proven that the permeable plastic pots of granular material manufactured in accordance with the method of this invention are quite acceptable for immediate planting of plants therein, and that the growth and development of plants in such pots is very satisfactory.

While the known, so-called outer or decorative pots made of a plastic material also contain pores, such pores are not in communication with each other and, therefore, the walls of such plastic articles cannot be penetrated by gases and liquids. As is known, decorative plastic pots of known manufacture are usually made by causing expansion of plastic particles by the addition of a suitable swelling or effervescing agent. In contrast to such non-permeable plastic products, a jar manufactured in accordance with the above-described novel method, i.e., by causing flow of a heated fluid medium through perforated or porous permeable walls of a mold and between the thermoplastic synthetic grains which are to be adhered to each other, permits ready passage of air through its permeable walls for satisfactory aeration of soil into which a flower or the like is planted. The large pores between adhering plastic grains define continuous and relatively large channels permitting passage of air to the soil in the receptacle. In addition, the pores may accommodate and store considerable quantities of water whereby the plant requires less frequent watering.

As may be observed in FIG. 3, the base of bottom 41 of the permeable plastic pot 32 need not be formed with the customary water-discharge aperture ordinarily provided in pots made of baked clay. Due to relatively large size of pores in the plastic product, its walls are permeable to water and permit escape of excess liquid without a special discharge aperture therefor. In addition, the danger of clogging the pores by incrustation, which is ever present in a pot of burned clay due to the evaporation of water on its outer surface, is practically non-existent in the novel article because its pores are of such magnitude that they cannot be rapidly filled by the scales developing when water evaporates on the outside. Should, however, any accumulation of scale or incrustation appear on the outside of my improved permeable plastic receptacle, they may be removed by a wet cloth as they are readily separable from the plastic surface. In contrast hereto, it is quite difficult to remove scale accumulating on the exterior of flower pots made of burned clay.

The starting substance in the practice of my novel method may be any suitable thermoplastic synthetic grain-sized material which will soften under the influence of heat and whose particles will adhere to each other along their contact surfaces when exposed to sufficiently raised temperatures. Among the readily available organic synthetic substances, various polymerisates are particularly suitable, for example, polystyrol.

The articles produced in accordance with the method of this invention are suitable for use whenever a high and even degree of fluid-permeability is required. Thus, various gas filters and liquid filters may be produced in the above-described manner. Such characteristics are also important in various types of diaphragms which find frequent application in certain branches of chemical industry.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention, therefore, such adaptation should and are intended to be comprehended within the meaning and range of equivalence of the following claims.

What is claimed as new and desired to be secured by Letters Patent is:

1. A method for producing a fluid-permeable shaped body, comprising the steps of introducing into a mold a loose, granular mass consisting of discrete latently adhesive grains of thermoplastic material, adapted to become actively adhesive at an elevated activating temperature corresponding to the softening temperature of said thermoplastic material, and forming therebetween interconnected pores within said mass, said mold having a cavity corresponding to the configuration of said shaped body and being formed with at least two opposite fluid-permeable wall portions formed of porous material; and introducing a stream of heating fluid being maintained at at least said activating temperature through one of said opposite permeable porous wall portions and thus subdivided and evenly distributed into said mold, said heating fluid leaving said mold through the other of said opposite permeable wall portions and passing between said opposite wall portions only through the interconnected pores between the granular particles of said mass directly contacting said individual granular particles so as to soften the surface portions only of said granular particles and to make the same actively adhesive, passage of said heating fluid through said mold being discontinued upon softening of said surface portions of said granular particles and before softening of the core portions of said granular particles occurs, thereby adhering contacting surface portions of adjacent granular particles to each other while substantially maintaining the initial dimensions of said granular particles and of said interconnected pores therebetween, thereby transforming said mass into a coherent, shaped fluid-permeable body of substantially even porosity throughout, formed with interconnected pores substantially corresponding to the interconnected pores of said loose granular mass in said mold and consisting exclusively of said adhering thermoplastic granular particles.

2. A method for producing a fluid-permeable shaped body, comprising the steps of filling a mold with a loose mass consisting of discrete latently adhesive grains of thermoplastic material selected from the group consisting of polystyrol and tetrafluoroethylene, adapted to become actively adhesive at an elevated activating temperature corresponding to the softening temperature of said thermoplastic material, and forming therebetween interconnected pores within said mass, said mold having a cavity corresponding to the configuration of said shaped body and being formed with at least two opposite fluid-permeable porous wall portions; and introducing a stream of hot air as heating fluid being maintained at at least said activating temperature through one of said opposite permeable porous wall portions and thus subdivided and evenly distributed into said mold, said hot air leaving said mold through the other of said opposite permeable wall portions and passing between said opposite wall portions only through the interconnected pores between the granular particles of said mass directly contacting said individual granular particles so as to soften the surface portions only of said granular particles and to make the same actively adhesive, passage of said heating fluid through said mold being discontinued upon softening of said surface portions of said granular particles and before softening of the core portions of said granular particles occurs, thereby adhering contacting surface portions of adjacent granular particles to each other while substantially maintaining the initial dimensions of said granular particles and of said interconnected pores therebetween, thereby transforming said mass into a coherent, shaped fluid-permeable body of substantially even porosity throughout, formed with interconnected pores substantially corresponding to the interconnected pores of said loose granular mass in said mold and consisting exclusively of said adhering thermoplastic granular particles.

3. A method for producing a fluid-permeable shaped body, comprising the steps of introducing into a mold only a loose mass consisting of discrete latently adhesive grains of thermoplastic material adapted to become actively adhesive at an elevated activating temperature corresponding to the softening temperature of said thermoplastic material, and forming therebetween interconnected pores within said mass, said mold having a cavity corresponding to the configuration of said shaped body and being formed with at least two opposite fluid-permeable wall portions; and introducing a stream of heating fluid being maintained at at least said activating temperature through one of said opposite permeable wall portions and thus subdivided and evenly distributed into said mold, said heating fluid leaving said mold through the other of said opposite permeable wall portions and passing between said opposite wall portions only through the interconnected pores between the granular particles of said mass directly contacting said individual granular particles so as to soften the surface portions only of said granular particles and to make the same actively adhesive, passage of said heating fluid through said mold being discontinued upon softening of said surface portions of said granular particles and before softening of the core portions of said granular particles occurs, thereby adhering contacting surface portions of adjacent granular particles to each other while substantially maintaining the initial dimensions of said granular particles and of said interconnected pores therebetween, thereby transforming said mass into a coherent, shaped fluid-permeable body of substantially even porosity throughout, formed with interconnected pores substantially corresponding to the interconnected pores of said loose granular mass in said mold and consisting exclusively of said adhering thermoplastic granular particles.

4. A method for producing a fluid-permeable shaped body, comprising the steps of introducing into a mold a loose mass consisting of discrete latently adhesive grains of thermoplastic material adapted to become actively adhesive at an elevated activating temperature corresponding to the softening temperature of said thermoplastic material, and forming therebetween interconnected pores within said mass, said mold having a cavity corresponding to the configuration of said shaped body and being formed with at least two opposite fluid-permeable wall portions; and introducing a stream of hot air as heating fluid being maintained at at least said activating temperature through one of said opposite permeable wall portions and thus subdivided and evenly distributed into said mold, said hot air leaving said mold through the other of said opposite permeable wall portions and passing between said opposite wall portions only through the interconnected pores between the granular particles of said mass directly contacting said individual granular particles so as to soften the surface portions only of said granular particles and to make the same actively adhesive, passage of said heating fluid through said mold being discontinued upon softening of said surface portions of said granular particles and before softening of the core portions of said granular particles occurs, thereby adhering contacting surface portions of adjacent granular particles to each other while substantially maintaining the initial dimensions of said granular particles and of said interconnected pores therebetween, thereby transforming said mass into a coherent, shaped fluid-permeable body of substantially even porosity throughout, formed with interconnected pores substantially corresponding to the interconnected pores of said loose granular mass in said mold and consisting exclusively of said adhering thermoplastic granular particles.

References Cited by the Examiner
UNITED STATES PATENTS

| | | | |
|---|---|---|---|
| 2,297,248 | 9/1942 | Rudolph | 264—123 XR |
| 2,430,868 | 11/1947 | Francis | 264—126 XR |
| 2,787,809 | 4/1957 | Stastny | 264—53 |
| 2,954,589 | 10/1960 | Brown | 264—46 |
| 3,002,248 | 10/1961 | Willson | 264—87 XR |
| 3,048,537 | 8/1962 | Pall et al. | 264—126 XR |
| 3,051,993 | 9/1962 | Goldman et al. | 264—125 |
| 3,099,042 | 7/1963 | Rabl | 264—126 |

FOREIGN PATENTS

| | | |
|---|---|---|
| 618,673 | 2/1949 | Great Britain. |
| 777,187 | 6/1957 | Great Britain. |

ALEXANDER H. BRODMERKEL, *Primary Examiner.*

ROBERT F. WHITE, ALFRED L. LEAVITT, *Examiners.*

P. E. ANDERSON, *Assistant Examiner.*